(12) United States Patent
Akiba

(10) Patent No.: US 9,940,049 B2
(45) Date of Patent: Apr. 10, 2018

(54) INFORMATION PROCESSING APPARATUS CAPABLE OF MOUNTING DATA STORAGE MEDIUM THAT STORES DATA

(71) Applicant: CANON KABUSHIKI KAISHA, Tokyo (JP)

(72) Inventor: Tomohiro Akiba, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 67 days.

(21) Appl. No.: 14/919,582

(22) Filed: Oct. 21, 2015

(65) Prior Publication Data
US 2016/0132260 A1 May 12, 2016

(30) Foreign Application Priority Data

Nov. 12, 2014 (JP) ................................. 2014-229909

(51) Int. Cl.
*G06F 3/06* (2006.01)

(52) U.S. Cl.
CPC .......... *G06F 3/0622* (2013.01); *G06F 3/0632* (2013.01); *G06F 3/0679* (2013.01)

(58) Field of Classification Search
CPC ....... H04N 1/00411; H04N 2201/0051; H04N 1/00477; H04N 2201/0036; H04N 2201/0087; H04N 1/00307; H04N 1/00925; H04N 1/00965; H04N 1/0097; H04N 2201/0072; G06F 3/0619; G06F 3/0634; G06F 3/0673; G06F 3/0679; G06F 3/0683; G06F 3/0632; G06F 3/0689
See application file for complete search history.

(56) References Cited

U.S. PATENT DOCUMENTS

| 5,892,896 | A | * | 4/1999 | Shingo | G11C 29/88 714/48 |
| 2002/0130956 | A1 | * | 9/2002 | Suzuki | H04N 1/00129 348/211.4 |
| 2007/0211287 | A1 | * | 9/2007 | Fujii | G06F 3/1204 358/1.16 |
| 2008/0198411 | A1 | * | 8/2008 | Ogasawara | G03G 15/5066 358/1.16 |
| 2008/0244677 | A1 | * | 10/2008 | Yamamoto | H04H 60/27 725/116 |
| 2009/0133081 | A1 | * | 5/2009 | Sakai | H04N 7/173 725/105 |
| 2010/0332692 | A1 | * | 12/2010 | Nakajima | H04N 1/00127 710/19 |

FOREIGN PATENT DOCUMENTS

JP          2003167681 A      6/2003

* cited by examiner

*Primary Examiner* — Hashem Farrokh
(74) *Attorney, Agent, or Firm* — Canon U.S.A., Inc. IP Division

(57) ABSTRACT

An information processing apparatus includes a setting storage unit configured to store a setting as to whether use of a data storage medium mounted to the information processing apparatus is permitted or prohibited, a control unit configured to control an access to the data storage medium based on the setting stored in the setting storage medium, an acceptance unit configured to accept an instruction for deleting data in the data storage medium, and a change unit configured to change, in response to the data in the data storage medium being deleted in accordance with the instruction accepted by the acceptance unit, the setting stored in the setting storage unit to indicate that the use of the data storage medium is prohibited.

7 Claims, 8 Drawing Sheets

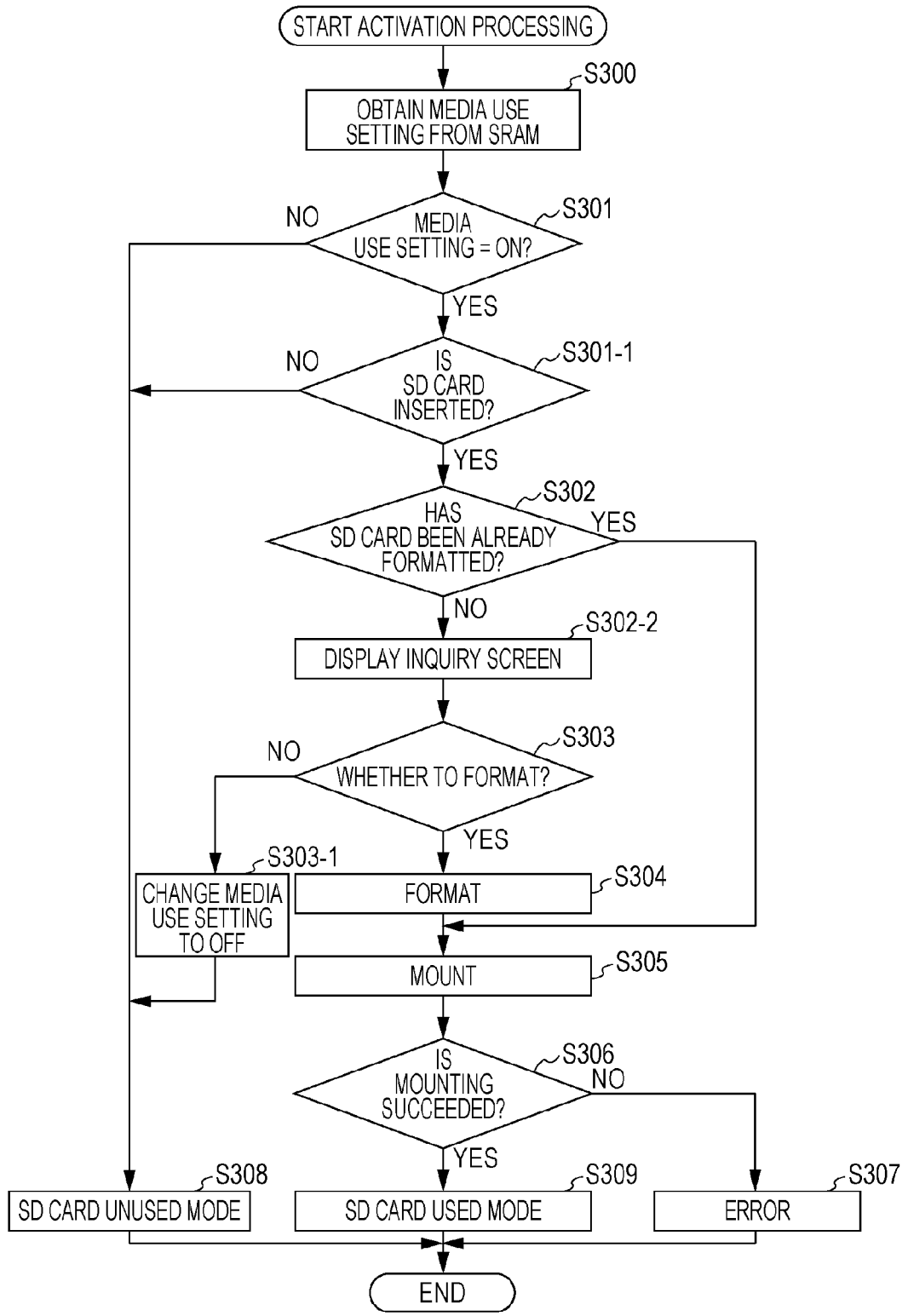

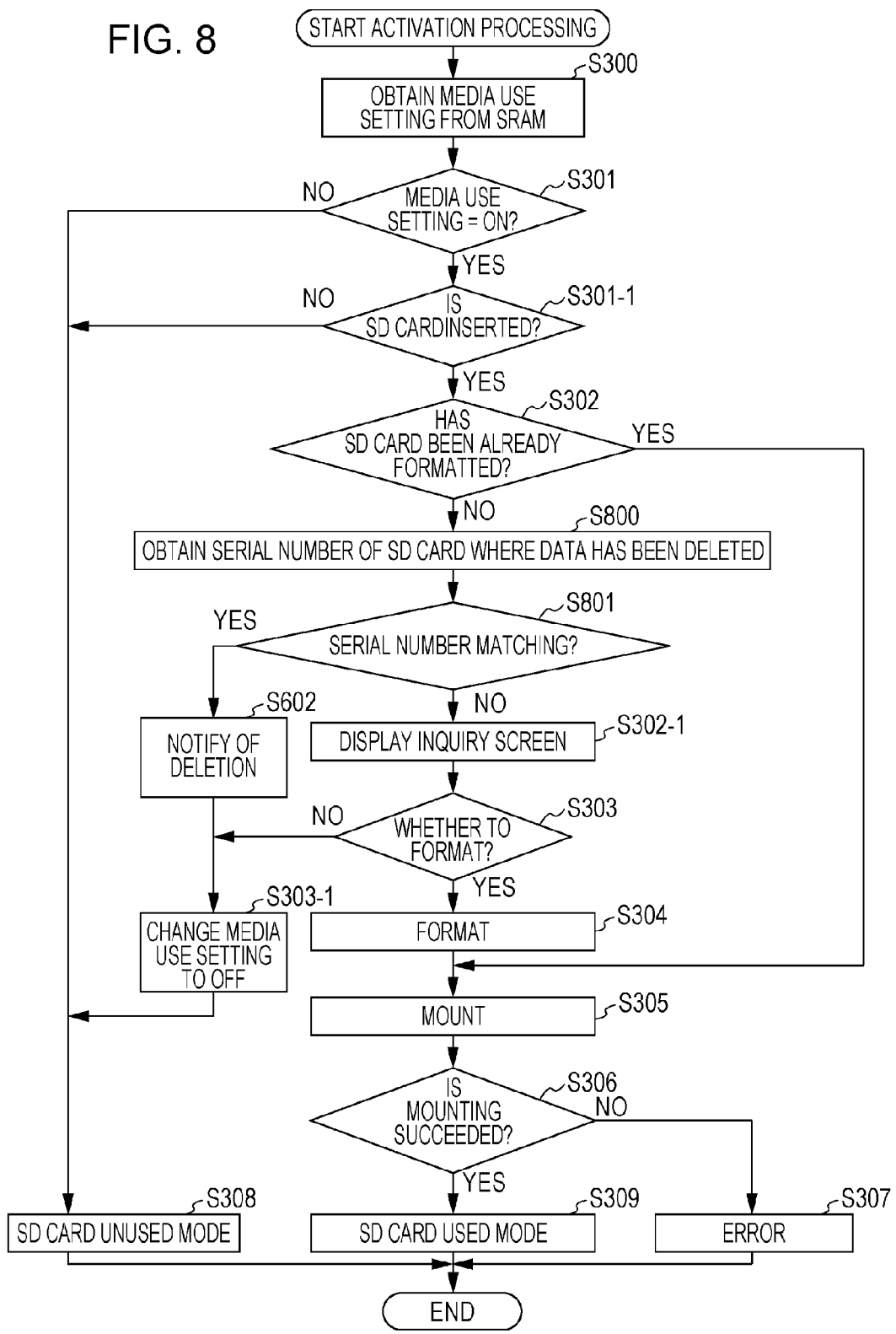

INFORMATION PROCESSING APPARATUS CAPABLE OF MOUNTING DATA STORAGE MEDIUM THAT STORES DATA

BACKGROUND OF THE INVENTION

Field of the Invention

The present invention relates to an information processing apparatus having a function of deleting data stored in a data storage medium.

Description of the Related Art

In recent years, a secondary storage device that holds various data is mounted to an apparatus such as a printer or a multi-function peripheral in many cases. Examples of the secondary storage device include an SD card, a flash memory, a USB memory, and an HDD (hereinafter, collectively referred to as external media).

In a case where the external media is mounted to the apparatus as described above, when the apparatus is discarded or returned since a lease period expires, a case occurs that the data in the external media is not deleted. In such a case, personal information or confidential information may be leaked to other users.

To avoid the above-described information leakage, a function of returning device settings and held data to factory default settings and a function of deleting the held data (hereinafter, collectively referred to as deletion function) may be provided (Japanese Patent Laid-Open No. 2003-167681). According to Japanese Patent Laid-Open No. 2003-167681, since discarding or returning is carried out after the deletion of the data in the media is executed by this deletion function, the information leakage is avoided.

Immediately after the deletion of the data in the external media is executed, when a power supply of the apparatus is turned on again in a state in which the external media is mounted, the apparatus recognizes the mounted external media and attempts to use this external media.

In a case where an individual uses the above-described apparatus, since the person who instructs the deletion of the data in the external media is the same as the person who uses the apparatus, the individual hardly uses the apparatus again in which the data in the external media has been deleted.

However, for example, in a case where the apparatus is used in an organization such as an institution or a company like a printer or a multi-function peripheral used in an office or the like instead of the use by the individual, a person who manages the apparatus (hereinafter, referred to as administrator) may exist. In such a case, even when the data in the external media is deleted on the basis of an instruction of the administrator, this apparatus may be used by the other user.

In the above-described case, if the power supply is turned on in a state in which the external media is mounted to the apparatus in the related art even when the data in the external media has been already deleted, this apparatus is operated in a mode in which this external media is to be used. For this reason, the user performs an operation of saving personal data in the external media again.

SUMMARY OF THE INVENTION

The present invention provides an apparatus and method useful for avoiding erroneous use of external media after data in the external media is deleted.

According to an aspect of the present invention, an information processing apparatus includes: a setting storage unit configured to store a setting as to whether use of a data storage medium mounted to the information processing apparatus is permitted or prohibited; a control unit configured to control an access to the data storage medium based on the setting stored in the setting storage medium; an acceptance unit configured to accept an instruction for deleting data in the data storage medium; and a change unit configured to change, in response to the data in the data storage medium being deleted in accordance with the instruction accepted by the acceptance unit, the setting stored in the setting storage unit to indicate that the use of the data storage medium is prohibited.

According to another aspect of the present invention, an information processing apparatus includes: an acceptance unit configured to accept an instruction for deleting data in a data storage medium mounted to the information processing apparatus; a writing unit configured to write in the data storage medium, in response to the data in the data storage medium being deleted in accordance with the instruction accepted by the acceptance unit, a data string indicating that the data has been deleted; and a control unit configured to determine whether the data string is written in the data storage medium mounted to the information processing apparatus and control an access to the data storage medium based on this determination.

According to yet another aspect of the present invention, an information processing apparatus includes: an acceptance unit configured to accept an instruction for deleting data in a data storage medium mounted to the information processing apparatus; a storage unit configured to store, in response to the data in the data storage medium being deleted in accordance with the instruction accepted by the acceptance unit, identification information of the data storage medium; and a control unit configured to determine whether identification information of the data storage medium that is obtained from the data storage medium mounted to the information processing apparatus is matched with the identification information stored in the storage unit and control an access to the data storage medium based on this determination.

Further features of the present invention will become apparent from the following description of exemplary embodiments with reference to the attached drawings.

BRIEF DESCRIPTION OF THE DRAWINGS

FIG. 3 is a flow chart for illustrating activation processing of the image forming apparatus.

FIG. 8 is a flow chart for illustrating the activation processing of the image forming apparatus according to the third exemplary embodiment.

DESCRIPTION OF THE EMBODIMENTS

Hereinafter, exemplary embodiments for carrying out the present invention will be described by using the drawings.

First Exemplary Embodiment

A configuration of an image forming apparatus to which an SD card can be mounted will be described by using FIG. 1. In the following explanation, the SD card will be described as an example of external media, and the image forming apparatus will be described as an example of information processing apparatuses. However, instead of the SD card, other memory cards such as a memory stick and smart media, a USB memory, and the like may be used as the external media. Various information processing apparatuses other than the image forming apparatus such as a personal computer (PC) and a smart phone can be applied as the information processing apparatus.

Figure 1:
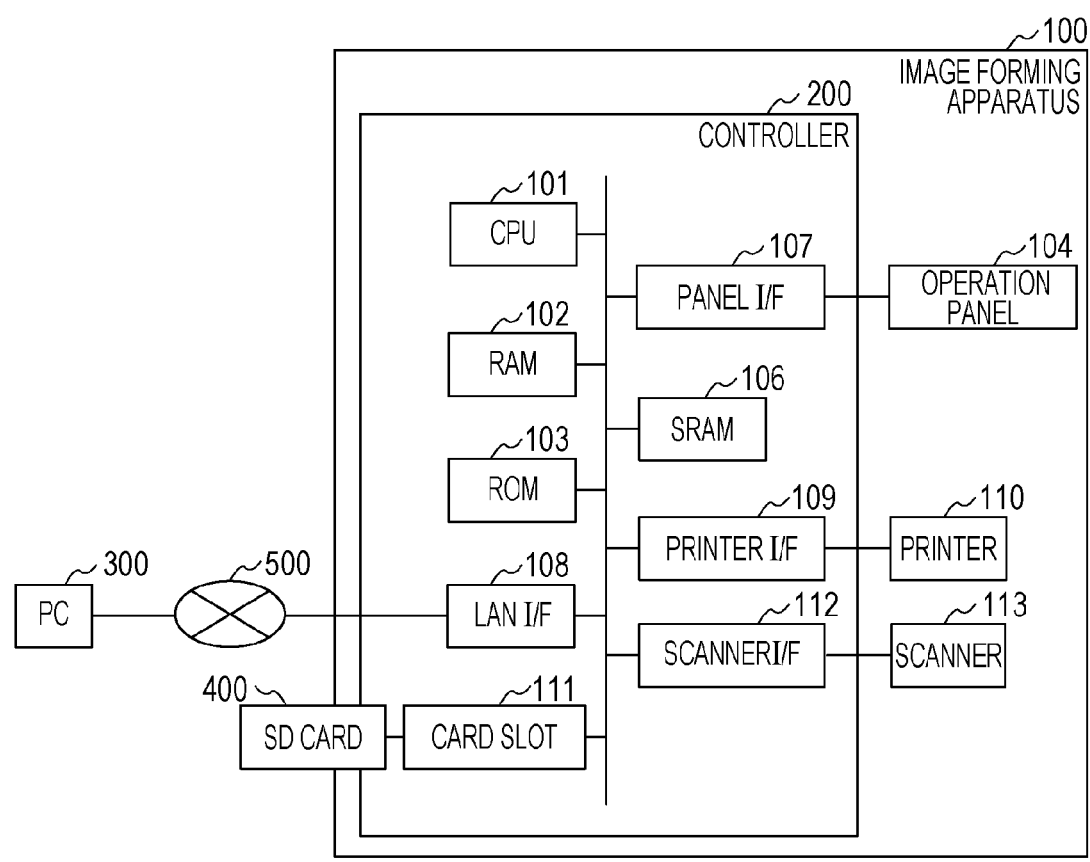
FIG. 1 illustrates a hardware configuration of an image forming apparatus.

An image forming apparatus 100 in FIG. 1 is connected to a local area network (LAN) 500 and communicates with a personal computer (hereinafter, referred to as PC) 300. The image forming apparatus 100 has a network printing function for printing data transmitted from the PC 300, a copying function for copying an original document, and a SEND function for sending the data obtained by the scanning to an external unit via the LAN 500.

The image forming apparatus 100 further enables an extended function when the SD card corresponding to an optional component is mounted to the image forming apparatus 100. The extended function includes, for example, a function for saving electronic data obtained by scanning a paper document and data sent from the PC in the SD card, a function for printing the data saved in the SD card, and the like. In addition to the above, the extended function includes a function for storing a personal file (for example, an address book or the like) of users who can log in to the image forming apparatus 100 in the SD card and customizing the apparatus on the basis of the personal file and the like.

Next, respective hardware modules provided in the image forming apparatus 100 will be described. A CPU 101 is a processor configured to execute a program code loaded from a ROM 103 to a RAM 102. The CPU 101 executes respective steps of flow charts in FIG. 2, FIG. 3, FIG. 5, FIG. 6, FIG. 7, and FIG. 8 which will be described below.

An operation panel 104 includes a display unit such as a liquid crystal panel for displaying an operation screen and an input unit such as a touch panel or a hardware button for accepting an operation from a user. The operation panel 104 communicates with the CPU 101 via a panel interface 107, notifies the user of processing contents of the CPU 101, and informs the CPU 101 of the information accepted from the user.

A LAN interface 108 is a network interface card (NIC) compliant with Ethernet (registered trademark) standards. The LAN interface 108 is an interface for performing communications with the PC 300 and the other network devices.

A card slot 111 is a memory card slot designed in a manner that an SD card 400 can be mounted thereto and functions as a media connection unit that establishes a connection with the external media. In a case where a memory card other than the SD card is used as the external media, a media connection unit corresponding to this external media is provided. For example, in the case of a USB memory, a USB port is provided as the external media connection unit.

A printer 110 is an image forming unit configured to perform printing on a recording sheet on the basis of image data transferred from the CPU 101 via a printer interface 109. A scanner 113 emits light to the paper document, reads reflected light by an image pickup element, and transfers the image data obtained by the reading to a controller 200 via a scanner interface 112.

An SRAM 106 is a memory that stores various settings of the image forming apparatus 100 and functions as a setting storage unit. According to the present exemplary embodiment, the SRAM 106 stores a setting indicating permission or prohibition of use of the SD card (hereinafter, referred to as media use setting) as one of the settings. The media use setting is read out by the CPU 101 at the time of the activation of the apparatus. When the read media use setting is ON, the CPU 101 activates the apparatus in an SD card used mode, and when the read media use setting is OFF, the CPU 101 activates the apparatus in an SD card unused mode.

The SD card used mode refers to a mode in which the SD card mounted to the card slot 111 is used. The SD card unused mode refers to a mode in which the SD card is not used irrespective of whether or not the SD card is mounted to the card slot 111.

When the image forming apparatus 100 is activated in the SD card used mode, the image forming apparatus 100 permits an access to the mounted SD card 400. Accordingly, it is possible to save document data and the personal file in the SD card 400 and print the document data and the personal file saved in the SD card 400.

On the other hand, when the image forming apparatus 100 is activated in the SD card unused mode, even when the SD card is mounted to the image forming apparatus 100, the image forming apparatus 100 prohibits the access to this SD card. That is, use of a function where the SD card is used is prohibited.

The media use setting stored in the SRAM 106 can be changed via screens of FIGS. 4A, 4B, 4C, and 4D which are displayed on the operation panel 104. An operation procedure for changing the media use setting will be described herein. First, when the image forming apparatus 100 is activated in the SD card used mode, the administrator selects an item [SD card] on the setup screen 401 of FIG. 4A and presses an OK button which is not illustrated in the drawing on the operation panel 104. The CPU 101 that has detected this press switches the display of the operation panel 104 from the screen 401 of FIG. 4A to a screen 402 of FIG. 4B. Subsequently, the administrator selects an item [use] on the SD card setting screen 402 of FIG. 4B and presses the OK button. Accordingly, the CPU 101 changes the media use setting stored in the SRAM 106 from ON to OFF to be stored in the SRAM 106 again. When this change processing is performed, and the apparatus is rebooted, the apparatus is put into the SD card unused mode.

The configuration of the image forming apparatus of FIG. 1 has been described above.

Figure 2:
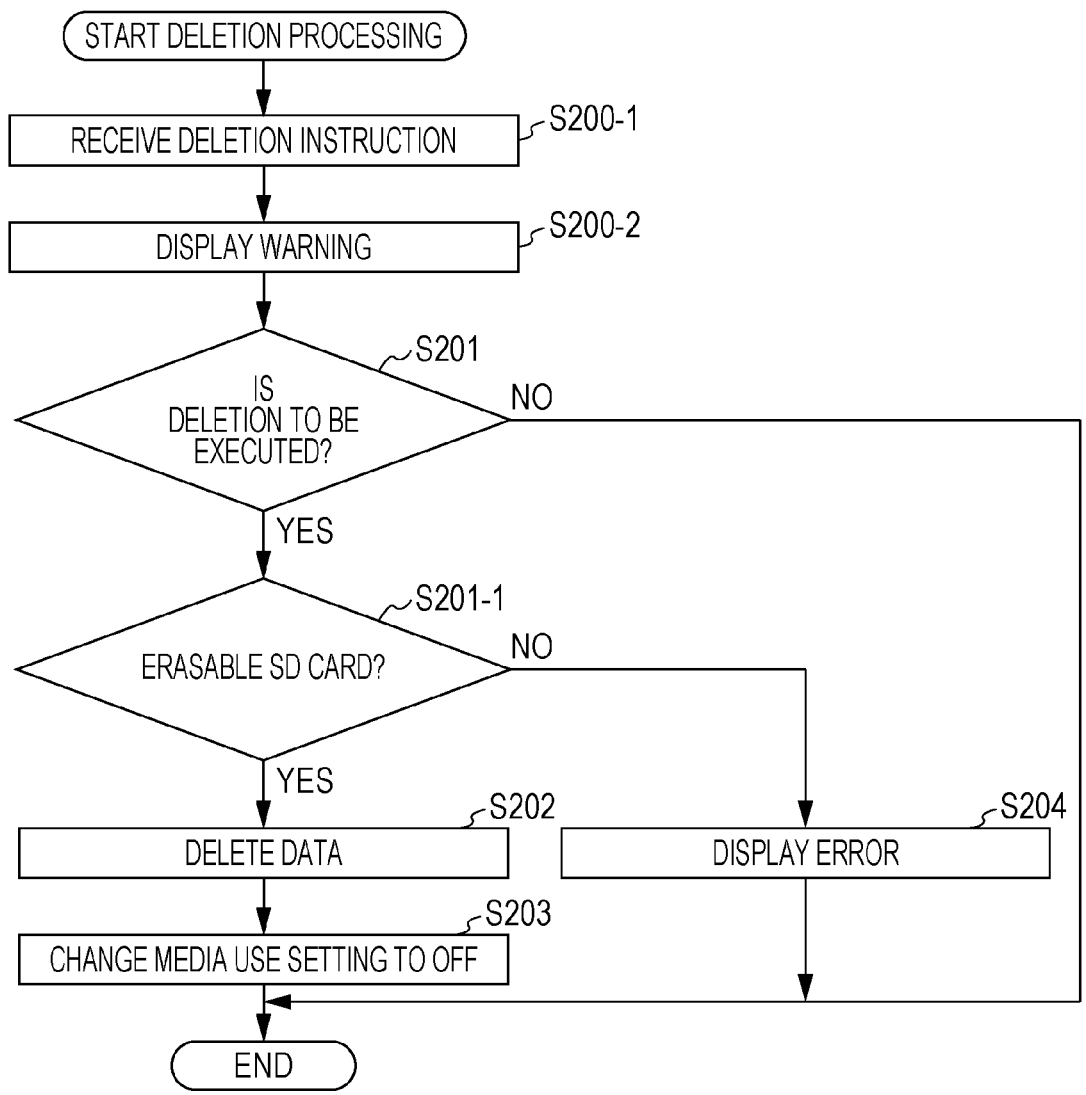
FIG. 2 is a flow chart for illustrating data deletion processing for an SD card.

FIG. 2 is a flow chart illustrating data deletion processing for the SD card which is executed when the image forming apparatus 100 is activated in the SD card used mode.

First, in step S200-1, the CPU 101 accepts a deletion instruction of the data in the external media from the user via the operation panel 104. The deletion instruction is issued by the administrator or the like when the image forming apparatus 100 is to be discarded, for example. In step S200-2, the CPU 101 displays a warning screen on the operation panel 104 in response to the accepted deletion instruction and notifies the user that the data stored in the SD card 400 will not be reusable. The warning screen includes a cancel button for the user to input a cancel instruction and a confirmation button to confirm the deletion. In step 5201, the CPU 101 waits for the instruction from the user and determines whether or not the cancel instruction is input on the warning screen. When it is determined that the cancel instruction is input, the data deletion processing is cancelled, and the processing in FIG. 2 is ended.

When it is determined in step 5201 that the confirmation instruction is input, the flow proceeds to step S201-1. In step S201-1, the CPU 101 determines whether or not the deletion of the data in the SD card 400 mounted to the card slot 111 can be performed. For example, when a write-protect switch of the SD card 400 is ON, it is determined as NO in step S201-1. In a case where it is determined as NO in step S201-1, the flow proceeds to step S204, and the CPU 101 displays an error screen indicating that the data deletion has failed on the operation panel 104. It is noted that, as a modified example, the processing in step S201-1 may be performed at the beginning in the processing in FIG. 2, and in a case where it is determined as NO as the result of the processing in step S201-1, the deletion instruction in step S200-1 may not be performed in the first place.

When it is determined as YES in step S201-1, the CPU 101 deletes all the data in the SD card 400 inserted to the card slot 111 in step 5202. A method of deleting the data is not particularly limited. For example, 0s or random numbers may be written in the entire area, or in a case where the SD card 400 is originally provided with a data deletion function, this function may be used. To avoid data leakage to outsides, all the data in the SD card 400 is desirably deleted, but a method of deleting a part of data such that the data becomes undecipherable may be adopted.

When the deletion of the data in the SD card 400 is ended in step S202, the flow proceeds to step S203. In step S203, the CPU 101 changes the media use setting stored in the SRAM 106 from ON to OFF, and the processing in FIG. 2 is ended. The media use setting changed in step S203 is used in processing of FIG. 3 which will be described below.

Although not illustrated in FIG. 2, the rebooting of the image forming apparatus 100 is desirably performed immediately after this change.

FIG. 3 is a flow chart illustrating the activation processing of the image forming apparatus 100.

First, the CPU 101 supplied with power obtains the media use setting stored in the SRAM 106 in step S300. Subsequently, the CPU 101 checks the obtained media use setting, and in a case where the media use setting is ON (step S301: YES), the flow proceeds to step S301-1. On the other hand, in a case where the obtained media use setting is OFF (step S301: NO), the flow proceeds to step S308.

In step S301-1, the CPU 101 determines whether or not the SD card is inserted to the card slot 111. This determination can be performed, for example, by checking a state of a card detection switch of the card slot 111. When it is determined that the SD card is inserted, the flow proceeds to step S302, and when it is determined that the SD card is not inserted, the flow proceeds to step S308.

In step S302, the CPU 101 determines whether or not the SD card inserted to the card slot 111 has been already formatted. When it is determined that the SD card has been already formatted, the flow proceeds to step S305. On the other hand, when it is determined that the SD card has not been formatted, the flow proceeds to step S302-2. In step S302-2, the CPU 101 displays the warning screen on the operation panel 104 and asks the user whether or not the SD card is to be formatted.

In step S303, the CPU 101 waits for the instruction from the user and determines whether or not the SD card is to be formatted. When the user instructs to format the SD card, the flow proceeds to step S304. When the user instructs not to format the SD card, the flow proceeds to step S303-1. In step S303-1, the CPU 101 changes the media use setting stored in the SRAM 106 from ON to OFF, and the flow proceeds to step S308.

In step S304, the CPU 101 executes formatting of the SD card 400 inserted to the card slot 111. In step S305, the CPU 101 mounts the SD card 400 such that an access to the SD card can be made from the program. In a case where the mounting has succeeded (step S306: YES), the flow proceeds to step S309, and in a case where the mounting has failed (step S306: NO), the flow proceeds to step S307.

Figure 4A:
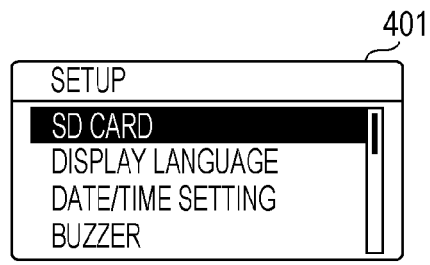
FIGS. 4A, 4B, 4C, and 4D illustrate examples of a screen displayed on an operation panel.
Figure 4B:
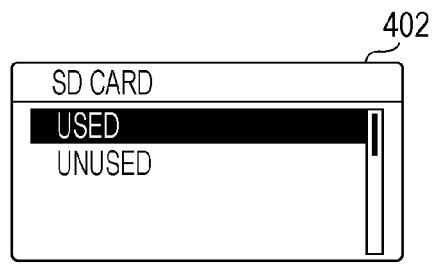
Figure 4C:
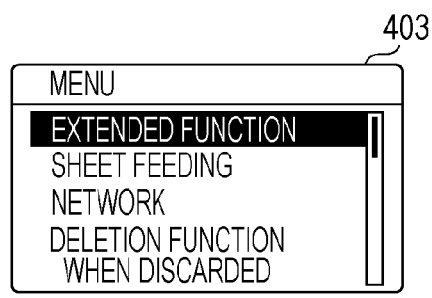
Figure 4D:
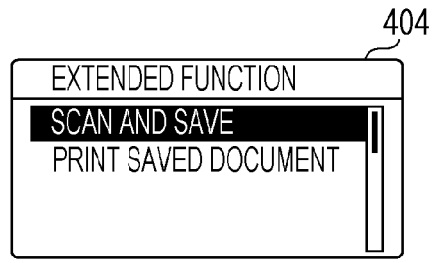

In step S308, the CPU 101 activates the apparatus in the SD card unused mode. When the apparatus is activated in the SD card unused mode, the function for saving the data in the SD card and the function for printing the data in the SD card are not available from a menu on the operation panel 104. That is, when an item "extended function" is selected on a screen of 403 FIG. 4C, items "scan and save" and "print saved document" on the screen 404 of FIG. 4D are not displayed.

In step S309, the CPU 101 activates the apparatus in the SD card used mode. When the apparatus is activated in the SD card used mode, buttons for selecting the function for saving the data in the SD card and the function for printing the data in the SD card are displayed on the menu screen on the operation panel 104. That is, the items "scan and save" and "print saved document" on the screen 404 of FIG. 4D are displayed.

In step S307, the CPU 101 displays an error screen on the operation panel 104, notifies the user that the activation processing has failed, and ends the processing of FIG. 3.

According to the processings in FIG. 2 and FIG. 3, the image forming apparatus 100 changes the media use setting from ON to OFF on the basis of the deletion of the data in the SD card. Subsequently, in a case where the image forming apparatus 100 is to be activated after the data deletion, since the above-described media use setting is set as OFF, the image forming apparatus 100 is activated in the SD card unused mode. As a result, a situation can be avoided where the SD card is used again to accumulate data after the data deletion.

The first exemplary embodiment has been described above. According to the first exemplary embodiment, when the data in the SD card is deleted, such a control that the use of the SD card is prohibited is carried out. Accordingly, it is possible to avoid the situation where the SD card is used again to accumulate data in a case where the image forming apparatus 100 is activated after the data deletion.

Second Exemplary Embodiment

Next, a second exemplary embodiment will be described. A hardware configuration of the image forming apparatus according to the second exemplary embodiment is similar to that of FIG. 1, and descriptions thereof will be omitted.

An example in which, after the deletion of the data in the SD card, a particular data string indicating that the data has been already deleted is written in the external media will be described by using FIG. 5 and FIG. 6.

Figure 5:
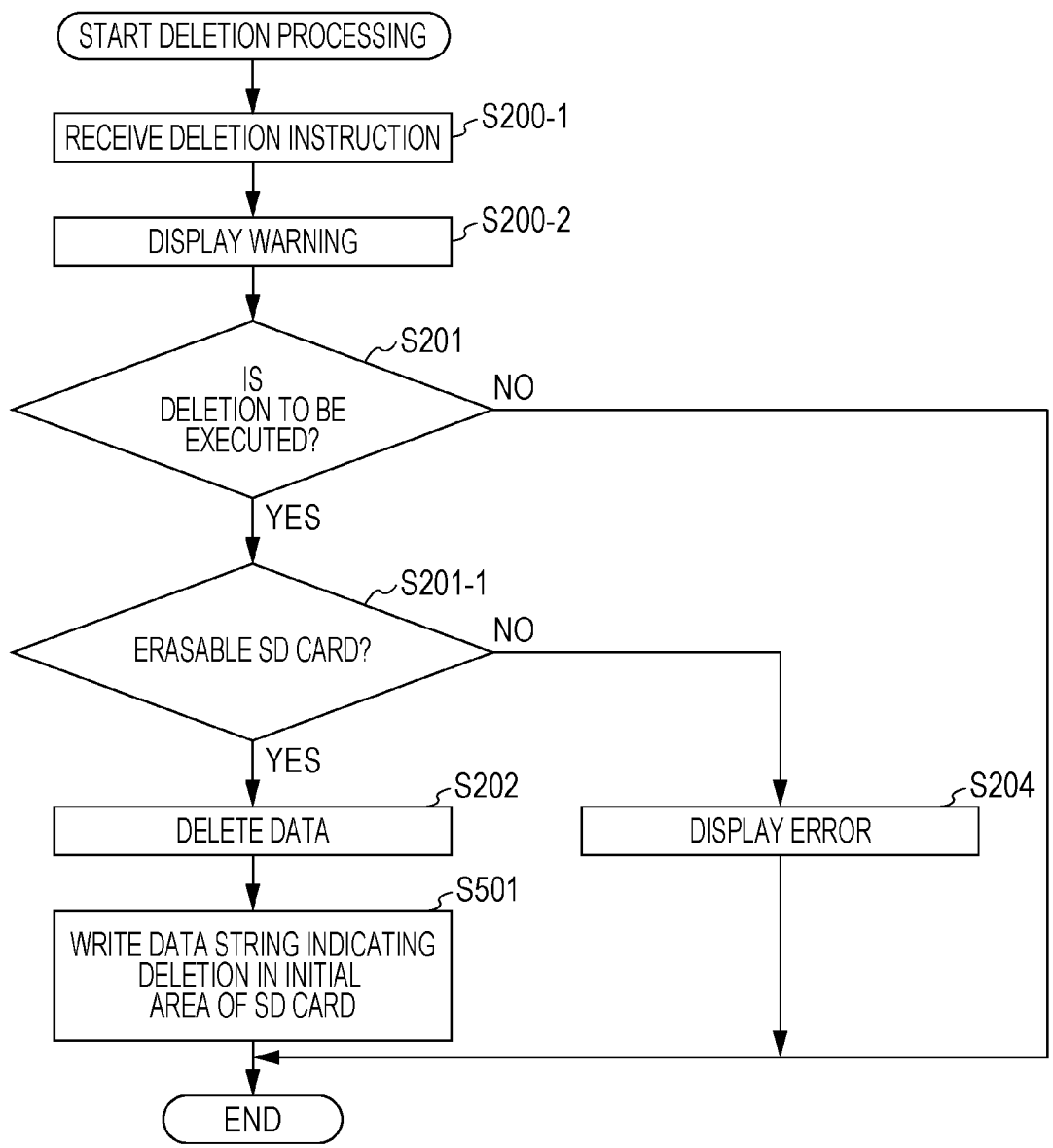
FIG. 5 is a flow chart for illustrating the data deletion processing for the SD card according to a second exemplary embodiment.

FIG. 5 is a flow chart illustrating the data deletion processing for the SD card. Descriptions of the processing common to that of FIG. 2 will be omitted.

In a case where the user performs the deletion instruction of the data in the external media, the processing in FIG. 5 is executed. After the processings in step S200-1, step S200-2, step S201, step S201-1, and step S202 are performed, the flow proceeds to the processing in step S501.

In step S501, the CPU 101 writes the data string indicating that the data has been already deleted in an initial area of the SD card 400. Subsequently, the CPU 101 stores information of the particular data string written in the SD card 400 and an address of the written storage area.

It is noted that the particular data string is written in the initial area in step S501, but a last area may be used instead of the initial area. The data string indicating that the data has been already deleted is used to be determined in the processing in FIG. 6, and a singular data string having a certain length or longer (for example, 16 bytes) is desirably employed.

Figure 6:
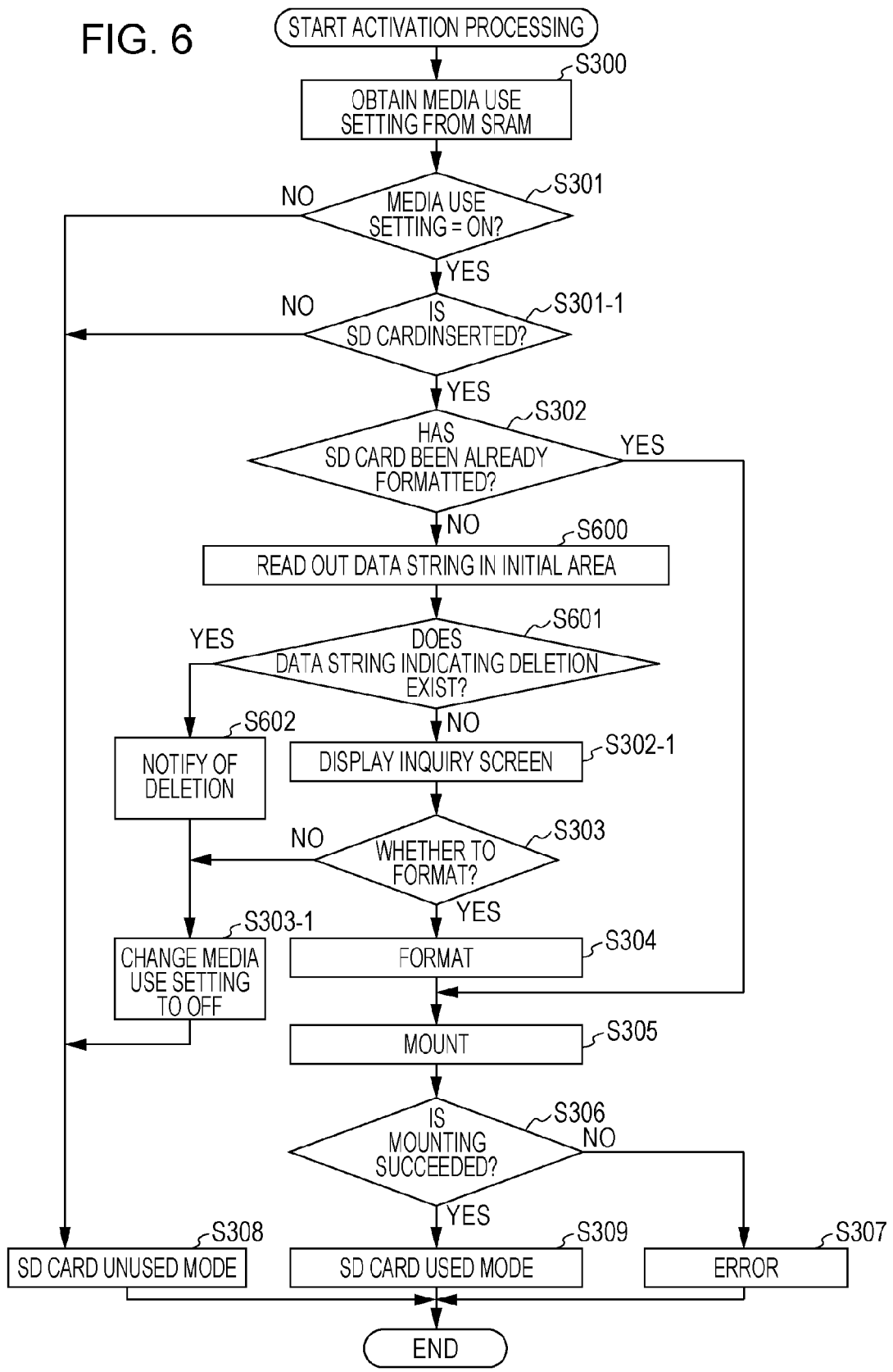
FIG. 6 is a flow chart for illustrating the activation processing of the image forming apparatus according to the second exemplary embodiment.

FIG. 6 is a flow chart illustrating the activation processing of the image forming apparatus 100. Descriptions of the processing common to that of FIG. 3 will be omitted.

After the processings in step S300, step S301, and step S302 are performed, the flow proceeds to the processing in step S600. In step S600, the CPU 101 reads out the data string in the initial area of the SD card inserted to the card slot 111. Subsequently, in step S601, the CPU 101 determines whether or not the read data string is the particular data string indicating that the data has been already deleted. In a case where the read data string is the data string indicating that the data has been already deleted, the flow proceeds to step S602, and in a case where the read data string is not the data string indicating that the data has been already deleted, the flow proceeds to step S302-1.

In step S602, since there is a possibility that the SD card 400 where the data has been already deleted is unintentionally used, the CPU 101 displays a warning message on the operation panel 104 and notifies the user that the data has been already deleted. When the processing in step S602 is executed, the flow proceeds to step S303-1.

The second exemplary embodiment has been described above. According to the second exemplary embodiment, when the data in the SD card is deleted by a deletion function upon discarding, the image forming apparatus 100 writes the particular data string in this SD card. Subsequently, when the SD card in which the particular data string has been written is inserted at the time of the next activation, the user is notified of that effect, and the SD card is shifted into the SD card unused mode. Accordingly, it is possible to avoid the situation where the SD card is used again to accumulate data in a case where the image forming apparatus 100 is activated after the data deletion.

Third Exemplary Embodiment

Next, a third exemplary embodiment will be described. A hardware configuration of the image forming apparatus according to the third exemplary embodiment is similar to that of FIG. 1, and descriptions thereof will be omitted.

An example in which a card unique ID such as a serial number of the SD card is held after the deletion of the data in the SD card will be described by using FIG. 7 and FIG. 8. Descriptions of the processing common to those of FIG. 2, FIG. 3, FIG. 5, and FIG. 6 will be omitted.

Figure 7:
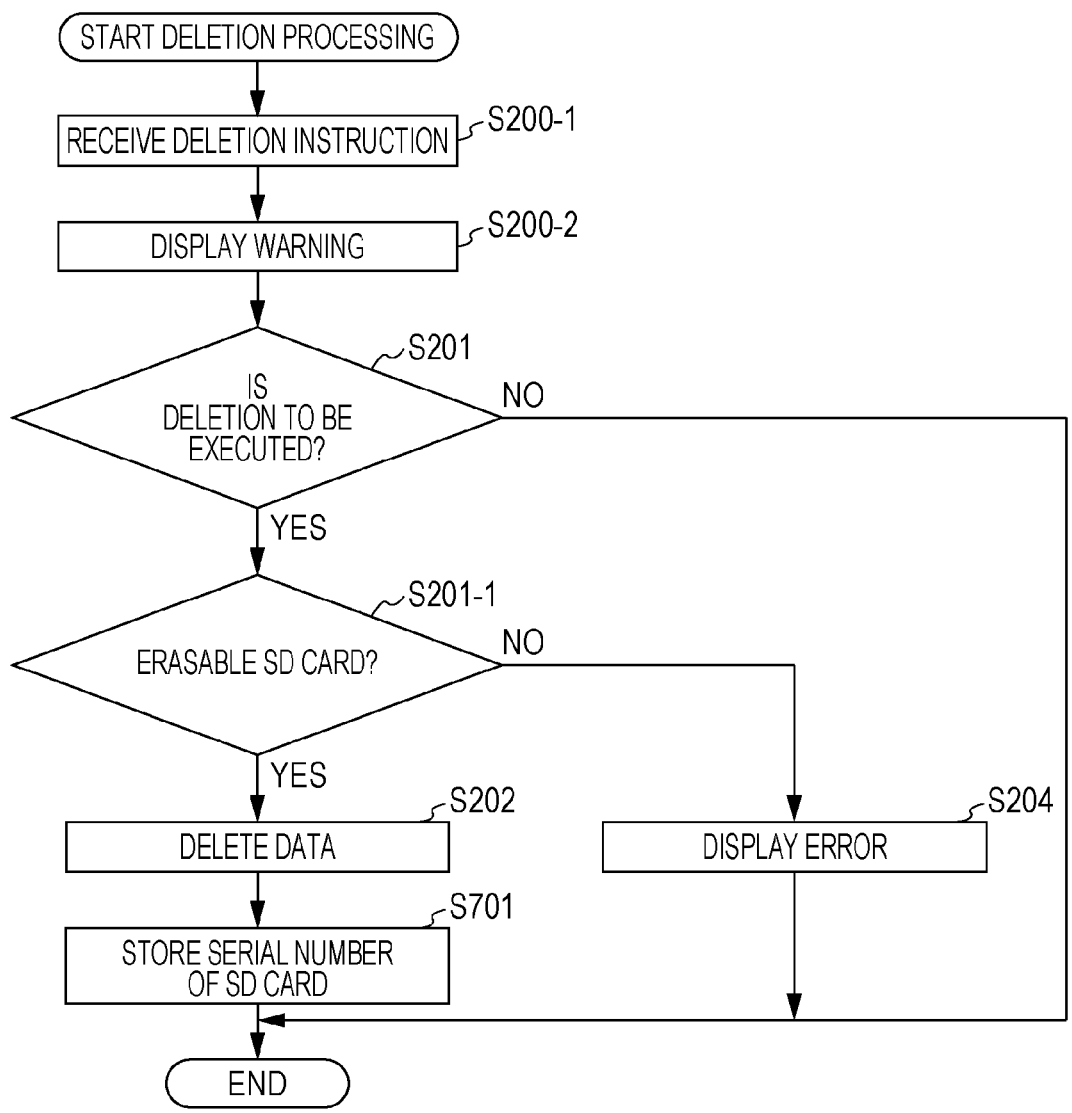
FIG. 7 is a flow chart for illustrating the data deletion processing for the SD card according to a third exemplary embodiment.

FIG. 7 is a flow chart illustrating the data deletion processing for the SD card. Descriptions of the processing common to that of FIG. 2 will be omitted.

In a case where the user issues the deletion instruction of the data in the external media, the processing in FIG. 7 is executed. After the processings in step S200-1, step S200-2, step S201, step S201-1, and step S202 are performed to end the data deletion, the flow proceeds to the processing in step S701.

In step S701, the CPU 101 holds a serial number of the SD card 400 in the SRAM 106. The serial number is an example of an identification number of the external media. The other information may be used as the identification information instead of the serial number.

FIG. 8 is a flow chart illustrating the activation processing of the image forming apparatus 100. Descriptions of the processing common to those of FIG. 3 and FIG. 6 will be omitted.

After the processings in step S300, step S301, step S301-1, and step S302 are performed, the flow proceeds to the processing in step S800.

In step S800, the CPU 101 obtains a serial number of the SD card inserted to the card slot 111. Furthermore, the CPU 101 compares the serial number with the media unique ID held in the SRAM 106 (step S801). As a result of the comparison, in a case where those are matched with each other, the flow proceeds to step S602. As a result of the comparison, in a case where those are not matched with each other, the serial number (identification information) of the SD card held in the SRAM 106 is deleted, and the flow proceeds to step S302-1.

The third exemplary embodiment has been described above. According to the third exemplary embodiment, when the data in the SD card is deleted by a deletion function upon discarding, the image forming apparatus 100 holds the serial number (identification information) of the SD card in which the data deletion has been ended, in the SRAM 106. Subsequently, when the SD card having this serial number is inserted upon the next activation, the user is notified of that effect (or the SD card is put into the SD card unused mode). Accordingly, it is possible to avoid the situation where the SD card is used again to accumulate data in a case where the image forming apparatus 100 is activated after the data deletion.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-229909, filed Nov. 12, 2014, which is hereby incorporated by reference herein in its entirety.

What is claimed is:

1. An information processing apparatus comprising:
a setting storage unit configured to store a setting, which can be set by a user via an operation panel of the information processing apparatus, as to whether or not a data storage medium which has been inserted to the information processing apparatus is to be used by the information processing apparatus;
an acceptance unit configured to accept an instruction for deleting data in the data storage medium; and
a change unit configured to change the setting in the setting storage unit into a setting indicating a data storage medium which has been inserted to the information processing apparatus is not to be used after the data in the data storage medium has been deleted in accordance with the instruction accepted by the acceptance unit,
wherein a format process to format the inserted data storage medium is not performed in a case where a setting indicating the data storage medium is to be used by the information processing apparatus is changed to the setting indicating the data storage medium is not to be used by the information processing apparatus.

2. The information processing apparatus according to claim 1, wherein the data storage medium is a memory card.

3. The information processing apparatus according to claim 1, wherein the instruction to be accepted by the acceptance unit is issued in a case where the information processing apparatus is discarded.

4. The information processing apparatus according to claim 1, further comprising:
a saving unit configured to save data in the data storage medium to which the access is permitted.

5. The information processing apparatus according to claim 1, further comprising:
a printing unit configured to print data saved in the data storage medium to which the access is permitted.

6. The information processing apparatus according to claim 1, further comprising:
a display unit configured to display a warning screen in a case where the access is prohibited by the control unit.

7. The information processing apparatus according to claim 1, wherein the change unit changes the setting stored by the setting storage unit in a case where a user performs an operation of changing permission or prohibition of the use of the data storage medium.

* * * * *